United States Patent
Lee

(10) Patent No.: US 7,760,768 B2
(45) Date of Patent: Jul. 20, 2010

(54) SYSTEM AND METHOD FOR ALLOCATING A PLURALITY OF SOURCES TO A PLURALITY OF CHANNELS

(75) Inventor: Ji Young Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1425 days.

(21) Appl. No.: 10/690,324

(22) Filed: Oct. 21, 2003

(65) Prior Publication Data

US 2004/0141516 A1 Jul. 22, 2004

(30) Foreign Application Priority Data

Jan. 18, 2003 (KR) .................. 10-2003-0003480

(51) Int. Cl.
*H04J 3/02* (2006.01)

(52) U.S. Cl. .................. 370/537; 370/540; 370/535

(58) Field of Classification Search ......... 370/535–537, 370/539, 540, 541, 542, 544
See application file for complete search history.

(56) References Cited

U.S. PATENT DOCUMENTS

| | | | | |
|---|---|---|---|---|
| 4,313,160 | A * | 1/1982 | Kaufman et al. ............... 710/23 |
| 5,303,382 | A | 4/1994 | Buch et al. .................. 395/725 |
| 5,805,927 | A | 9/1998 | Bowes et al. .................. 710/23 |
| 5,892,760 | A * | 4/1999 | Athenes et al. ............. 370/379 |
| 5,892,766 | A * | 4/1999 | Wicki et al. ................. 370/412 |
| 5,982,459 | A * | 11/1999 | Fandrianto et al. ....... 348/425.3 |
| 5,983,301 | A * | 11/1999 | Baker et al. ................. 710/113 |
| 5,991,817 | A * | 11/1999 | Rowett et al. ............... 709/250 |
| 6,006,286 | A * | 12/1999 | Baker et al. ................... 710/22 |
| 6,188,699 | B1 * | 2/2001 | Lang et al. .................. 370/463 |
| 6,201,793 | B1 * | 3/2001 | Chen et al. .................. 370/238 |
| 6,226,338 | B1 * | 5/2001 | Earnest ....................... 375/372 |
| 6,249,520 | B1 * | 6/2001 | Steely et al. ................ 370/368 |
| 6,366,583 | B2 * | 4/2002 | Rowett et al. ............... 370/401 |
| 6,671,761 | B2 | 12/2003 | Kim |
| 6,738,881 | B1 * | 5/2004 | Ollivier et al. .............. 711/168 |
| 6,809,944 | B2 * | 10/2004 | Regev et al. ............. 365/49.15 |
| 7,016,337 | B1 * | 3/2006 | Wu et al. ..................... 370/352 |

(Continued)

FOREIGN PATENT DOCUMENTS

CN 1337628 A 2/2002

(Continued)

*Primary Examiner*—Pankaj Kumar
*Assistant Examiner*—Mark A Mais
(74) *Attorney, Agent, or Firm*—Mills & Onello, LLP

(57) ABSTRACT

A system and method for allocating sources to channels is provided. Multiple sources provide input signals to be transferred to the channels. Storage units associated with the channels store source identification information for each of the sources that transfer input signals to the channels. Selection circuit selectively pass one of the plurality of input signals from a respective one of the plurality of sources according to a state of a respective control input to the selection circuit, the control input for each selection circuit being determined based on the source identification information of a source associated with the selection circuit. A checking circuit checks outputs of the selection circuits and forwards passed input signals to the channel, such that the input channels are forwarded to the channel according to the priorities associated with the sources. The invention for allocating multiple sources to multiple channels can be applied to a direct memory access (DMA) controller.

70 Claims, 10 Drawing Sheets

U.S. PATENT DOCUMENTS

| | | | |
|---|---|---|---|
| 7,240,129 B2 * | 7/2007 | Hayden et al. | 710/22 |
| 7,559,031 B2 * | 7/2009 | Kawamura et al. | 715/753 |
| 7,593,433 B1 * | 9/2009 | Wu et al. | 370/537 |
| 2002/0023186 A1 | 2/2002 | Kim | |

FOREIGN PATENT DOCUMENTS

| | | |
|---|---|---|
| DE | 42 09 889 | 2/1993 |
| EP | 1 059 588 | 12/2000 |
| EP | 1 076 293 | 2/2001 |
| JP | 63-226151 A | 9/1988 |
| JP | 5-35653 A | 2/1993 |
| JP | 9-139757 A | 5/1997 |
| JP | 11-284692 A | 10/1999 |
| JP | 2001-273248 | 10/2001 |
| JP | 2002-091901 | 3/2002 |
| WO | WO 02/35345 | 5/2002 |

* cited by examiner

SYSTEM AND METHOD FOR ALLOCATING A PLURALITY OF SOURCES TO A PLURALITY OF CHANNELS This application claims the priority of Korean Patent Application No. 2003-0003480, filed on Jan. 18, 2003, in the Korean Intellectual Property Office, the contents of which are incorporated herein in their entirety by reference.

BACKGROUND OF THE INVENTION

1. Field of the Invention

The invention is directed to a system and method for allocating a plurality of sources to a plurality of communication channels.

2. Background of the Invention

In general, communication systems in digital networks and systems such as processing systems include a plurality of sources or source devices which transfer signals such as data signals to a plurality of receivers or receiving devices over a plurality of communication channels. Typically, the multiple sources share the multiple channels. Since simultaneous transfer of signals by multiple sources over the same channel is to be avoided, techniques for sharing the channels without simultaneous transfer have been developed. One technique involves allowing sources access to the channels in order based on priority of the sources.

Typically, in these priority-based approaches, a priority value is assigned to each source. When a plurality of sources simultaneously request the use of a channel, the priority values assigned to the sources are compared, and a source having the highest priority value is selected and is allocated to a channel which corresponds to that source.

FIG. 1 illustrates an example of a conventional channel allocation system 100. Referring to FIG. 1, priority values PR 1~PR N and PR N+1~PR 2N for channel allocation are assigned to sources Src 1~Src N and Src N+1~Src 2N, respectively. When the sources Src 1~Src N and Src N+1~Src 2N request the use of channels 120 and 140, the priority values PR 1~PR N and PR N+1~PR 2N are input to priority calculating and channel request source selecting units 110 and 130. The priority calculating and channel request source selecting units 110 and 130 output source signals Ch1_RSID and Ch2_RSID which have the highest priority value among the sources Src 1~Src N and Src N+1~Src 2N, respectively, and allocate sources Ch1_RSID and Ch2_RSID to the channels 120 and 140.

In the structure of the conventional system, the channel is fixed on each of the sources. That is, sources Src 1~Src N shown in the upper portion of FIG. 1 use only the first channel 120, and sources Src N+1~Src 2N shown in the lower portion of FIG. 1 use only the second channel 140. Thus, when the upper sources Src 1~Src N try to simultaneously transmit data using the two channels, data transmission is not possible. That is, sources Src 1~Src N cannot transmit signals on the second channel 140, and sources Src N+1~Src 2N cannot transmit signals on the first channel 120.

Further, the conventional channel allocation system 100 inevitably requires a complicated unit such as the priority calculating and channel request source selecting units 110 and 130 to search a source having the highest priority value whenever a plurality of sources request the use of a channel. That is, as the number of sources which request the use of the channel increases, an arithmetic processing step of comparing the ranked priority values requires additional time, and thus, the process time is longer.

FIG. 2 is a circuit diagram illustrating in detail the structure of the priority calculating and channel request source selecting unit 110 of FIG. 1. With reference to FIG. 2, each source Src 1~Src N includes a register in which priority values PR 1~PR N are stored. When the sources request the use of the channel, priority values stored in the register corresponding to each of the sources are compared to each another, and the source having the highest priority value is selected. In order to perform this operation, comparators 22-1, 22-2~22-M, and 240 are required. The size and number of the comparators increase as the number of input sources and registers increase. When a comparison operation increases in complexity with an increase in the number of input sources Src 1~Src N, the comparison operation may be divided into several stages according to the frequency of an applied controlling clock.

FIG. 2 illustrates an example in which N sources Src 1~Src N and priority values PR 1~PR N are input to M comparators 22-1~22-M. First comparators 22-1~22-M output signals from sources having the highest priority. The signals from the sources are stored in registers 23-1~23-M. Then, the priority values of the sources output from the registers 23-1~23-M are compared with one another by a second comparator 240, and the signal from the source having the highest priority value is output and stored in a register 250. The source signal output from the register 250 is encoded by an encoder 260 and is allocated to the requested-channels.

FIG. 3 is an operational timing diagram of the priority calculating and channel request source selecting unit 110 of FIG. 2. Referring to FIG. 3, after a request (RS) signal and a priority value (PR) of a source are input, one cycle is required to perform a comparison operation by the first comparators 22-1~22-M. Again, one cycle is required to perform a comparison operation by the second comparator 240. As a result, as the number of the input sources Src 1~Src N increases, the number of registers and the number of comparison operations increase. The arithmetic processing step of comparing the priority values becomes more complicated. Thus, more cycle time is required. That is, the conventional channel allocation system is a non-effective system in which the amount and complexity of required circuitry increases and more cycle time is required.

SUMMARY OF THE INVENTION

In one aspect, the present invention is directed to a system and method for transferring a signal to a channel. A plurality of sources provide a respective plurality of input signals to be transferred to the channel. A storage unit is associated with the channel and stores source identification information for each of the sources that transfer input signals to the channel. A plurality of selection circuits receive the plurality of input signals. Each of the selection circuits selectively passes one of the plurality of input signals from a respective one of the plurality of sources according to a state of a respective control input to the selection circuit. The control input for each selection circuit is determined based on the source identification information of a source associated with the selection circuit. A checking circuit checks outputs of the selection circuits and forwards passed input signals to the channel, such that the input signals are forwarded to the channel according to the priorities associated with the sources.

The storage unit can be a register. It can store the source identification information for the sources in order of priority of the sources for access to the channel. For example, the source identification information for a highest-priority source can be stored in the most significant bits of the storage unit. The source identification information can be stored in the storage unit according to priority from the most significant bits to the least significant bits of the storage unit. The information can also be stored according to priority from the least significant bits to the most significant bits.

The checking circuit can check the outputs of the selection circuits in a predetermined sequence. The sequence can be determined by an order in which the source identification information of the sources is stored in the storage unit. The checking circuit can check the outputs of the selection circuits in order of priority of the sources for forwarding input signals to the channel.

The system can include a plurality of channels, input signals from the sources being able to be forwarded on the plurality of channels. In this embodiment, the system includes a plurality of storage units associated respectively with the plurality of channels. Each of the storage units can store source identification information for sources that are able to forward input signals on to the channel associated with the storage unit.

In one embodiment, the selection circuits are multiplexers. The multiplexers can be ordered according to priorities of the sources for forwarding input signals to the channel.

The sources can be applied to inputs of the selection circuits according to a predetermined order. The predetermined order can depend on priority of the sources for access to the channel. The source identification information can be generated according to the predetermined order such that the selection circuits select the sources based on priority of the sources for access to the channel. The source identification information can be generated according to the predetermined order such that the selection circuits select the sources based on the priority of the sources for access to the channel.

The system also includes a channel unit associated with the channel for processing information related to the channel. The storage unit can be part of the channel unit.

In another aspect, the invention is directed to a system which allocates a plurality of sources to a plurality of channels. The plurality of sources provide a respective plurality of input signals, and the plurality of channels receive the input signals. Multiple storage units, each associated with one of the channels, are adapted to store source identification information for each of the sources that can transfer input signals to the associated channel. For each of the plurality of channels, a plurality of selection circuits receive the plurality of input signals that can be transferred to the channel. Each of the selection circuits selectively passes one of the plurality of input signals from a respective one of the plurality of sources that can transfer input signals to the channel according to a state of a respective control input to the selection circuit. The control input for each selection circuit is determined based on the source identification information of a source associated with the selection circuit. For each of the plurality of channels, a checking circuit checks outputs of the selection circuits and forwards passed input signals to the channel, such that the input signals are forwarded to the channel according to the priorities associated with the sources.

One or more of the sources can be allocated to one or more of the channels. That is, at least one of the sources can transfer signals on more than one channel. The allocation of the sources to the channels can be controlled by controlling storage of source identification information in the storage units.

In another aspect, the invention is directed to a direct memory access (DMA) controller which controls transfer of input signals from input sources to output devices. In this aspect, the DMA controller includes a plurality of channels for receiving the input signals, the channels being connected to the output devices. The system also includes a plurality of storage units, each storage unit being associated with one of the channels and each storage unit being adapted to store source identification information for each of the sources that can transfer input signals to the associated channel. For each of the plurality of channels, a plurality of selection circuits receives the plurality of input signals that can be transferred to the channel. Each of the selection circuits selectively passes one of the plurality of input signals from a respective one of the plurality of sources that can transfer input signals to the channel according to a state of a respective control input selection circuit. The control input for each selection circuit is determined based on the source identification information of a source associated with the selection circuit. For each of the plurality of channels, a checking circuit checks output of the selection circuits and forwards passed input signals to the channels, such that the input signals are forwarded to the channel according to the priorities associated with the sources.

The system of the invention provides numerous advantages over the approaches of the prior art. For example, priority checking in the present invention is accomplished via a predetermined sequence. This is in contrast to the complicated comparison steps of the prior art. Because of the predetermined sequence of the invention, complex circuitry and complex priority comparison computations are eliminated. This results in reduced circuit size and complexity and reduced process time.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

The present invention provides a method and a system for effectively and dynamically allocating a plurality of sources to a plurality of channels. The invention is applicable to the case in which the number of channels through which signals are transmitted is less than the number of sources to transmit data through the channels. Unlike the prior art, the system of the invention can be implemented without registers assigned to each source for storing a priority value to the source defining the access to the channel by the source. Instead, the present invention provides a register assigned to each channel. Source identifiers (IDs) which identify sources that may use a channel are stored in the register assigned or associated with the channel according to the priority of the associated sources. This eliminates the need for complicated priority value comparison circuitry and operations. Also, channels are more flexibly and dynamically used.

Figure 4:
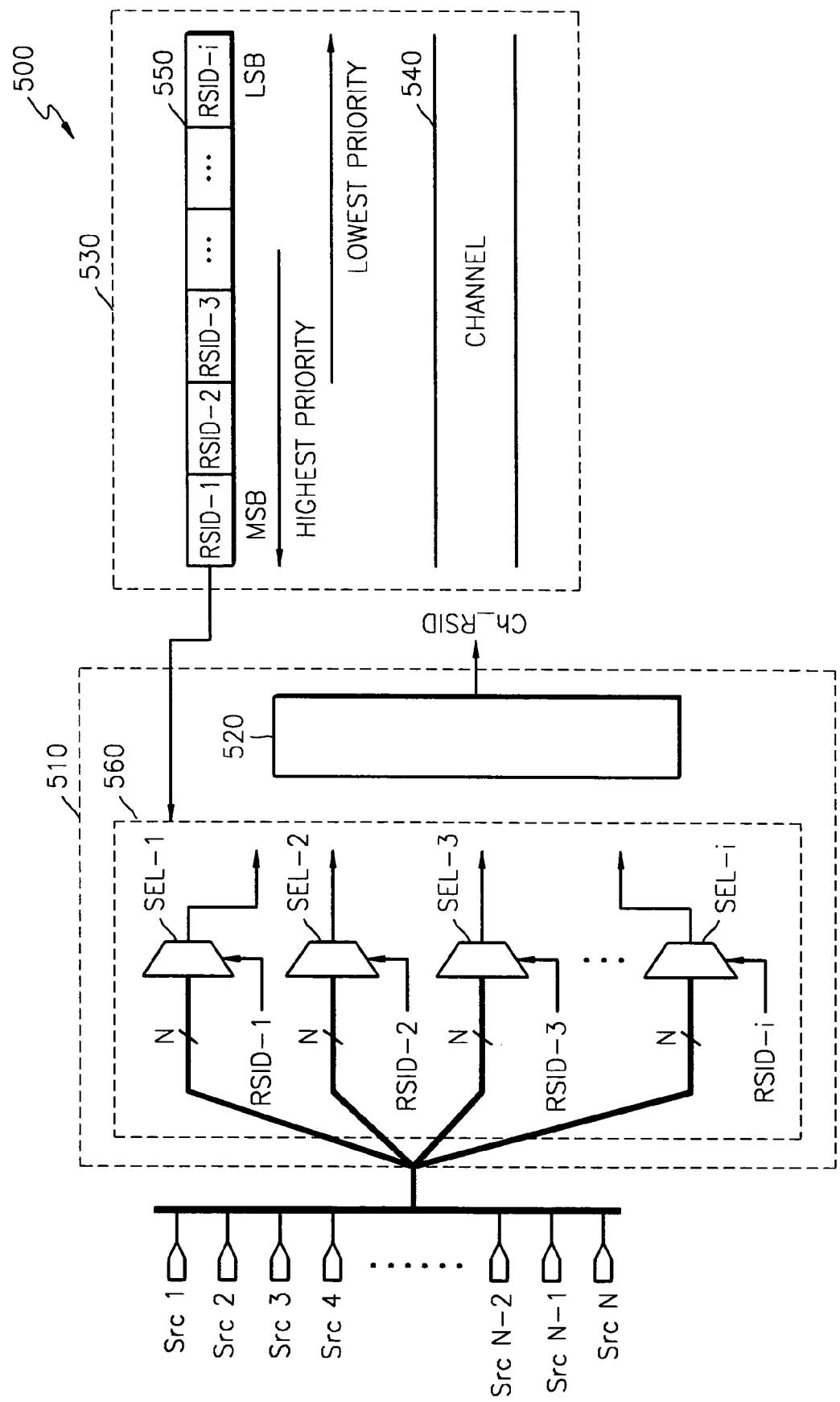
FIG. 4 contains a schematic block diagram of a system for allocating a plurality of sources to predetermined channels in accordance with an embodiment of the present invention.

FIG. 4 contains a schematic block diagram of a system 500 for allocating a plurality of sources to predetermined channels in accordance with an embodiment of the present invention. Referring to FIG. 4, a channel unit 530 includes a register 550 in which a predetermined number i of input sources that use a channel 540 are stored according to their priorities. Source identifiers (RSIDs) stored in the register 550 represent the order of sources connected to ports and are encoded to be used as identifiers. As described below, the priority value of request source ID is expressed by its bit location in the register 550 such that a complicated comparison operation is not required.

Each source ID is stored in the register 550 of the channel unit 530 according to its priority. Thus, when the register 550 is loaded, the location of each source ID is determined according to its priority. The source IDs are connected to a channel request source selecting unit 510. The channel request source selecting unit 510 includes a requested source selecting unit (RS selecting unit) 560 and a searching logic unit 520. The RS selecting unit 560 includes selecting means SEL-1, SEL-2, . . . , and SEL-i. The selecting means SEL-1 through SEL-i can be multiplexers. A plurality of sources Src 1~Src N are input to the selecting means, and source IDs RSID-1, RSID-2, and RSID-3~RSID-i in the register 550 of the channel unit 530 are used as selection signals of the selecting means. Each source ID is used to select the signal from the source it identifies to be passed to the output of its multiplexer by being applied to the selection control input of the multiplexer. That is, the source identified, for example, by RSID-2 is output by multiplexer SEL-2 when the output is enabled.

The sources transmit input signals to the channel request source selecting unit 510. Each input signal identifies the source that transmitted it to the selecting unit 510. The input signals are tested to determine which of the sources that transmitted a signal has the highest priority. That source is then allowed access to the channel to transmit data to the channel. Hence, these input signals act as selecting signals. When the input signal matches a highest-priority source ID at the selecting unit 510, the corresponding input signal is selected and passed. Thereafter, the selected source is provided access to the channel.

The searching logic unit 520 to which outputs of the RS selecting unit 560 are input, selects a source having the highest priority value as a final source ID Ch_RSID and passes the signal to the channel 540, thereby allowing the source to use the channel 540. Here, outputs of the RS selecting unit 560 are source IDs selected in response to selection signals RSID-1, RSID-2, and RSID-3~RSID-i of the RS selecting unit 560 among the input sources Src 1~Src N to simultaneously access the channel 540. Since locations of the source IDs RSID-1, RSID-2, and RSID-3~RSID-i of the register 550 of the channel unit 530 are determined according to their priorities and RSID-1, RSID-2, and RSID~RSID-i are connected to the channel request source selecting unit 510, the outputs of the RS selecting unit 560 are also determined according to their priorities. Thus, in one embodiment as illustrated in FIG. 4, the searching logic unit 520 can search a source having the highest priority value by simple sequential search without using a complicated comparison operation. This sequential search is used when the source IDs are loaded into the register 550 in order of priority, for example, with the highest-priority source ID being stored in the most significant bits of the register 550 and the lowest-priority source ID being stored in the least significant bits. Also, in this case, the source IDs are connected to the selection inputs of the multiplexers in the order shown such that a sequential search by the searching logic 520 from multiplexer SEL-1 through SEL-i in order will result in the highest-priority source having the first access to the channel.

It will be understood that the ordering of the storage positions of the source IDs in the register 550 can be different. For example, they can be stored such that the lowest-priority source ID is in the MSBs and the highest-priority source ID is in the LSBs. In that case, the connections of the IDs to the multiplexers can be reversed such that the search from SEL-1 through SEL-i will result in the highest-priority source having channel access first. Alternatively, the IDs can be connected as shown in FIG. 4, but the order of the checking sequence can be reversed. In general, the source IDs can be stored in the register 550 in any order desired. The connection of the IDs to the multiplexers and/or the search sequence can be controlled accordingly to ensure that the highest-priority source has first access to the channel. This flexibility can also allow the priorities of sources to be varied. This can be accomplished by changing the location of the source IDs in the register 550 or by altering the programming in the searching logic to pass the source signals in any desired order.

Figure 5:
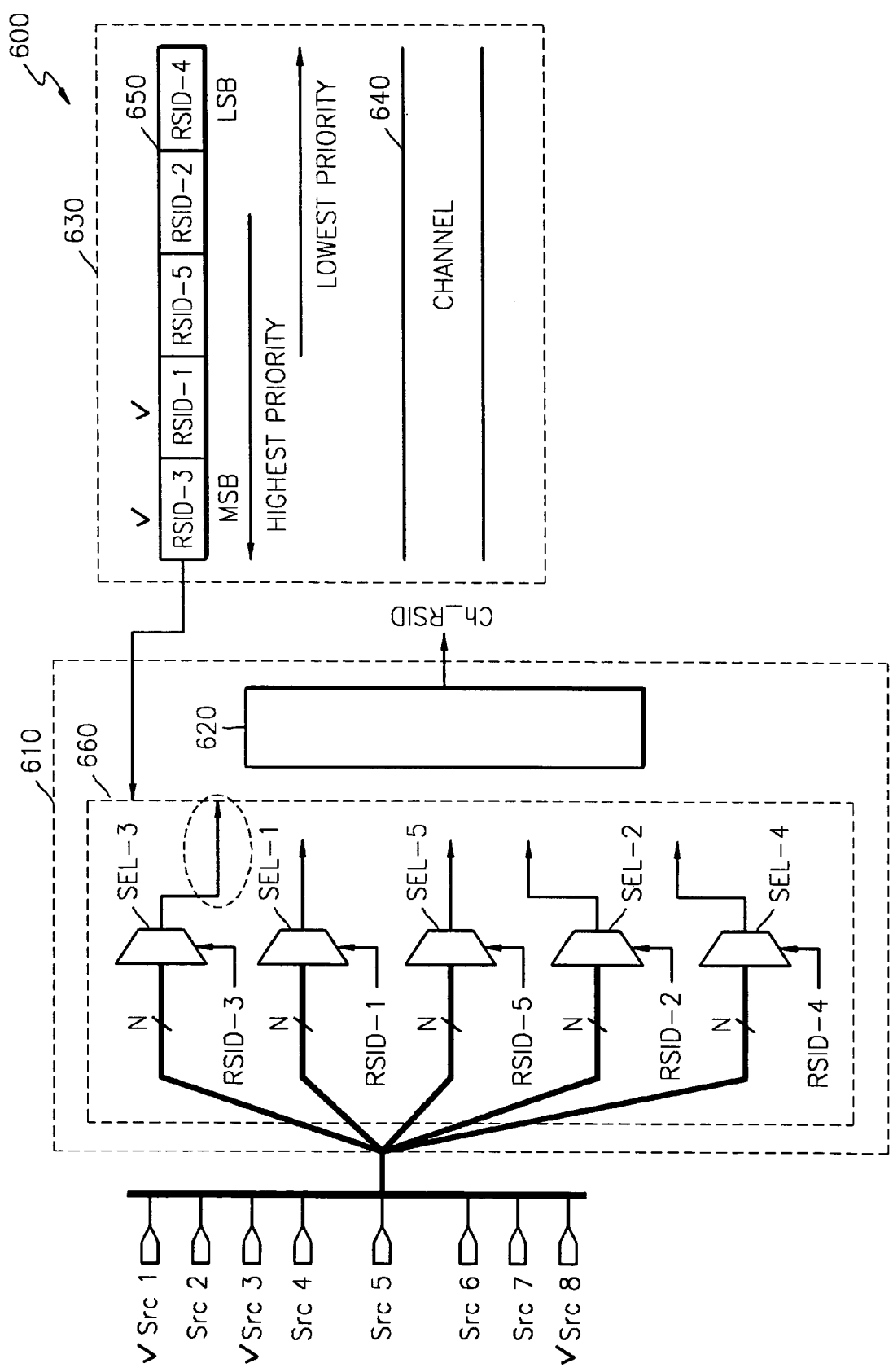
FIG. 5 contains a schematic block diagram of an illustrative example of the system of FIG. 4.

FIG. 5 is a schematic block diagram of an illustrative example of the system of FIG. 4. For the example, if is assumed that N=8, I=5, and encoded values of a plurality of sources Src 1~Src 8 are RSID-1 RSID-8. Five input sources to use a channel are stored in the following order: RSID-3, RSID-1, RSID-5, RSID-2, and RSID-4. When the input sources Src 1, Src 3, and Src 8 simultaneously try to use a channel, only input sources Src 1 and Src 3 are selected in response to selection signals RSID-1 and RSID-3 of an RS selecting unit 660 and are applied to a searching logic unit 620. Since the connection of the selection signals RSID-1~RSID-5 with the RS selecting unit 660 is determined according to the priority of a register, the searching logic unit 620 detects that the priority of the selection signal RSID-3 is higher than the priority of the selection signal RSID-1 by sequentially searching. As a result, the input source Src 3 gains access to the channel.

Figure 6:
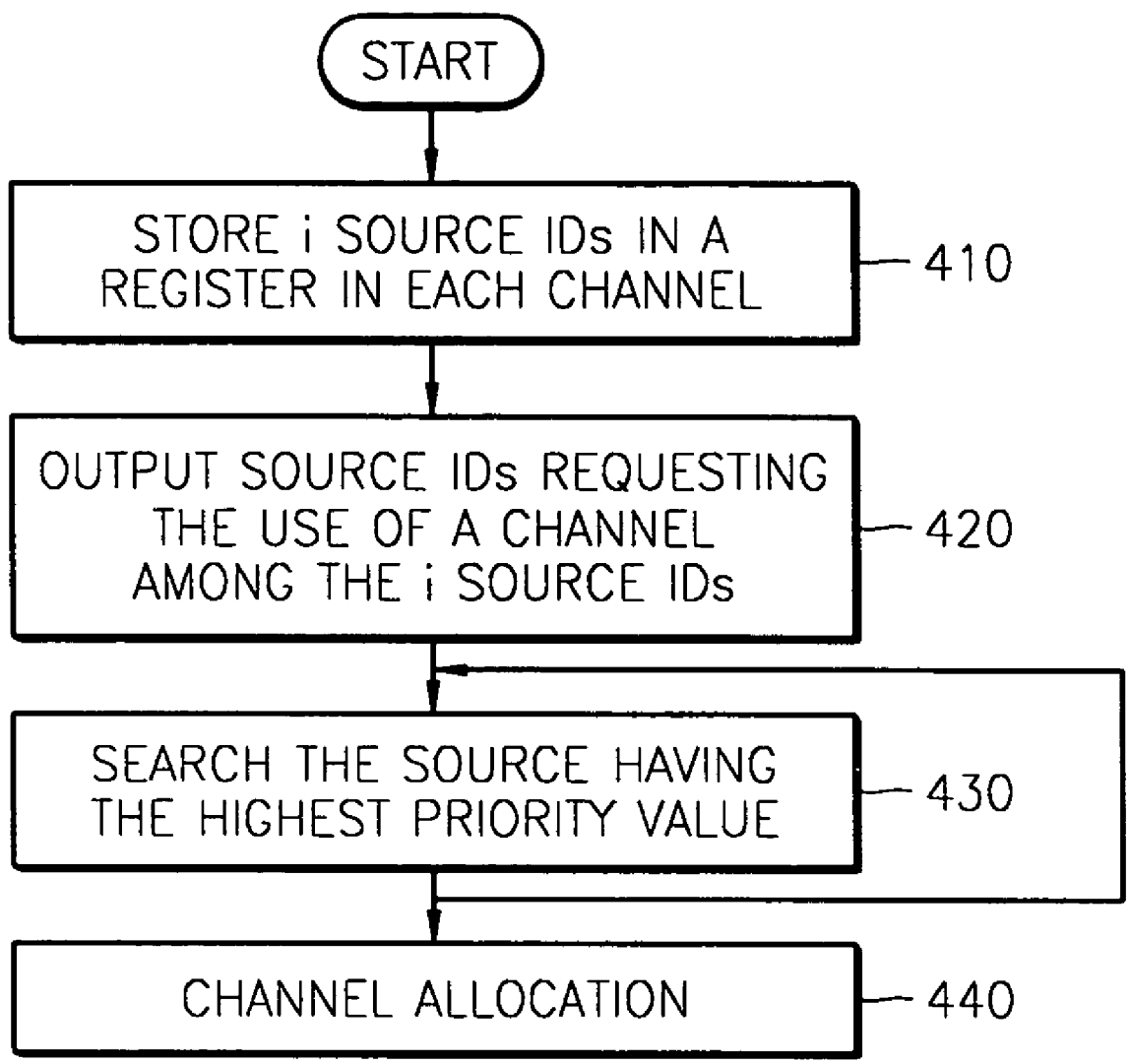
FIG. 6 contains a flowchart illustrating a method for allocating a plurality of requesting sources to a plurality of channels in accordance with the invention.

FIG. 6 contains a flowchart illustrating a method for allocating a plurality of requesting sources to a plurality of channels, as described with reference FIGS. 4 and 5. Referring to FIG. 6, in step 410, a quantity i of source IDs are stored in a channel register. In this case, the source IDs are stored in the register according to their priorities. In step 420, source IDs requesting the use of a channel among the i source IDs are output. In step 430, among the output source IDs, a source having the highest priority value is searched. In step 440, a channel is allocated to the searched source as a result of step 430. After a channel service is completed, the method proceeds back to step 430, and the source having the next highest priority value remaining is searched.

Figure 7:
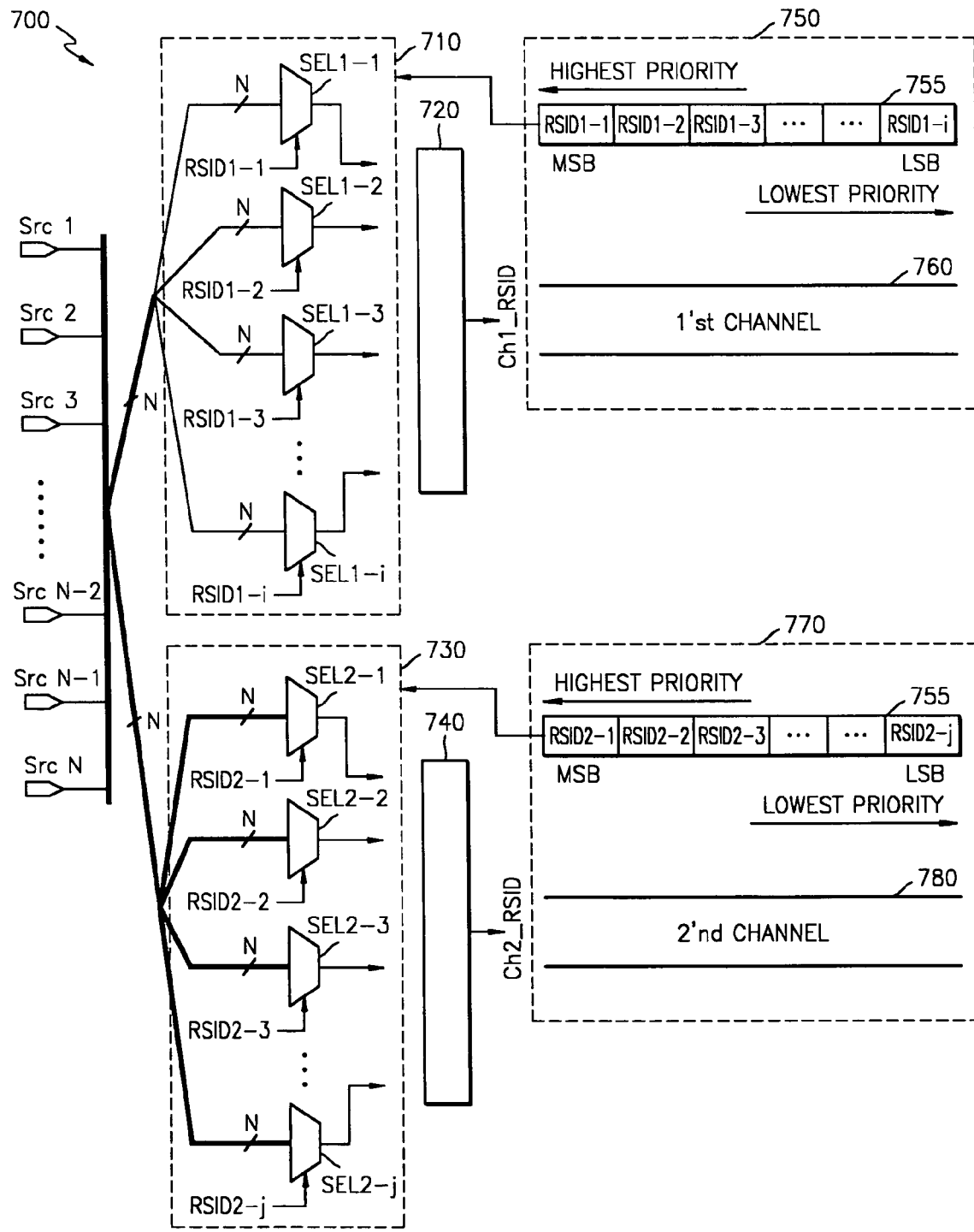
FIG. 7 contains a schematic block diagram of another embodiment of the invention in which a plurality of sources can be allocated to a plurality of channels.

FIG. 7 contains a schematic block diagram of another embodiment of the invention in which a plurality of sources can be allocated to a plurality of channels. This embodiment may be applied to all fields in which there are several competitive transmission channels and there are several transmission request signals (sources) to transmit data using these channels. The system 500 of FIG. 4 includes one channel 540, but the present invention may be also applied to a system having several channels, as illustrated in FIG. 7.

As shown in FIG. 7, a system 700 for allocating a plurality of sources to L channels includes first through L-th requested source selecting units 710 and 730, and first through L-th channel units 750 and 770. (In the exemplary embodiment of FIG. 7 and hereinafter, it is assumed that L=2. It will be understood that the invention is applicable to any number L of channels.)

Each of the first and second channel units 750 and 770 includes registers 755 and 775 in which input sources of a predetermined number i and j are stored according to their priorities. The number of i and j of the input sources stored in each register is determined according to the characteristics of each channel, i.e, they are the same or different from each other. The requested source selecting units 710 and 730, the searching logic units 720 and 740 and the channel units 750 and 770 of FIG. 7 have the same function and structure as their counterparts in the embodiment of the invention illustrated in FIG. 5.

Figure 1:
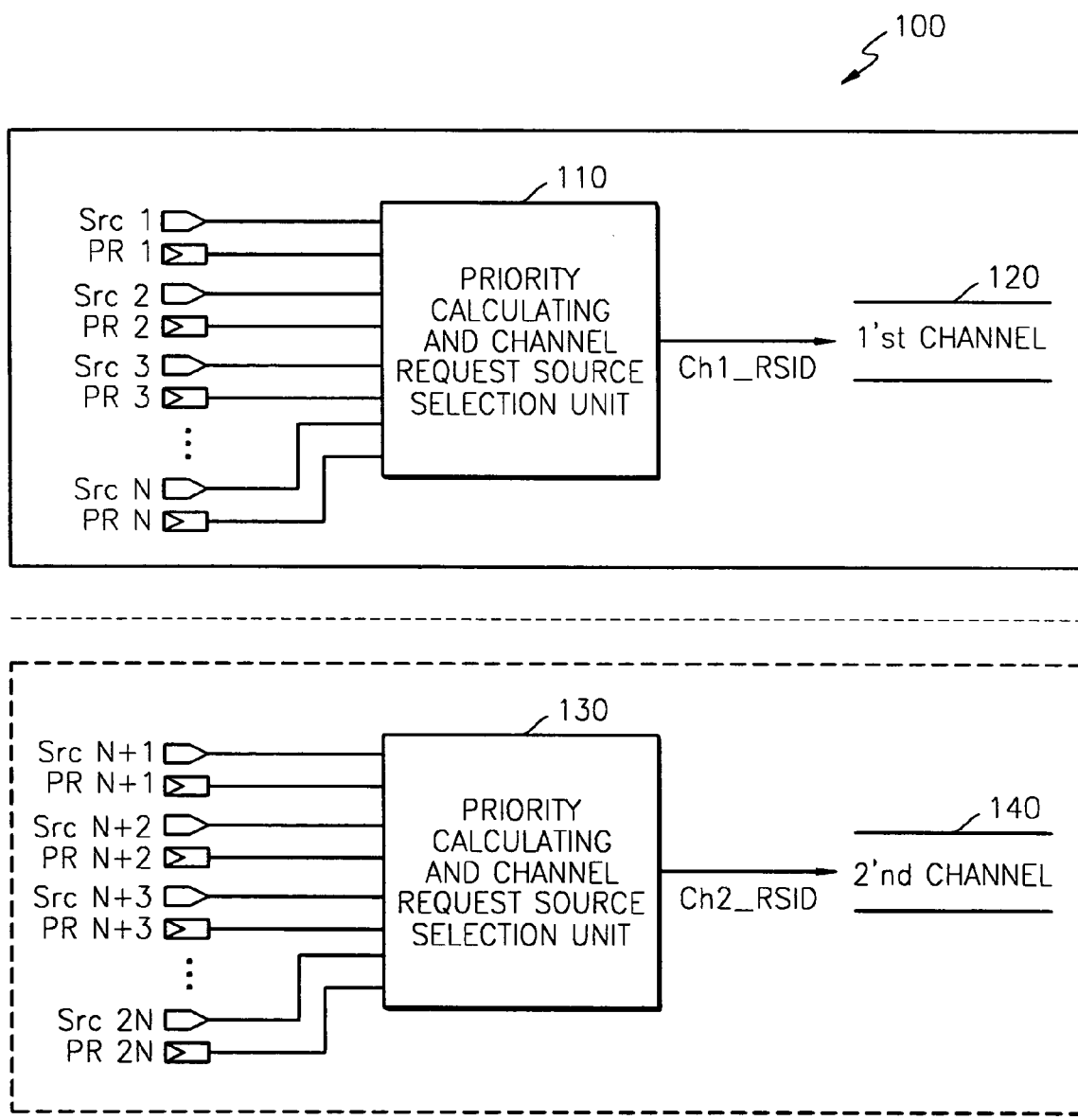
FIG. 1 contains a block diagram of a conventional channel allocation system.
Figure 2:
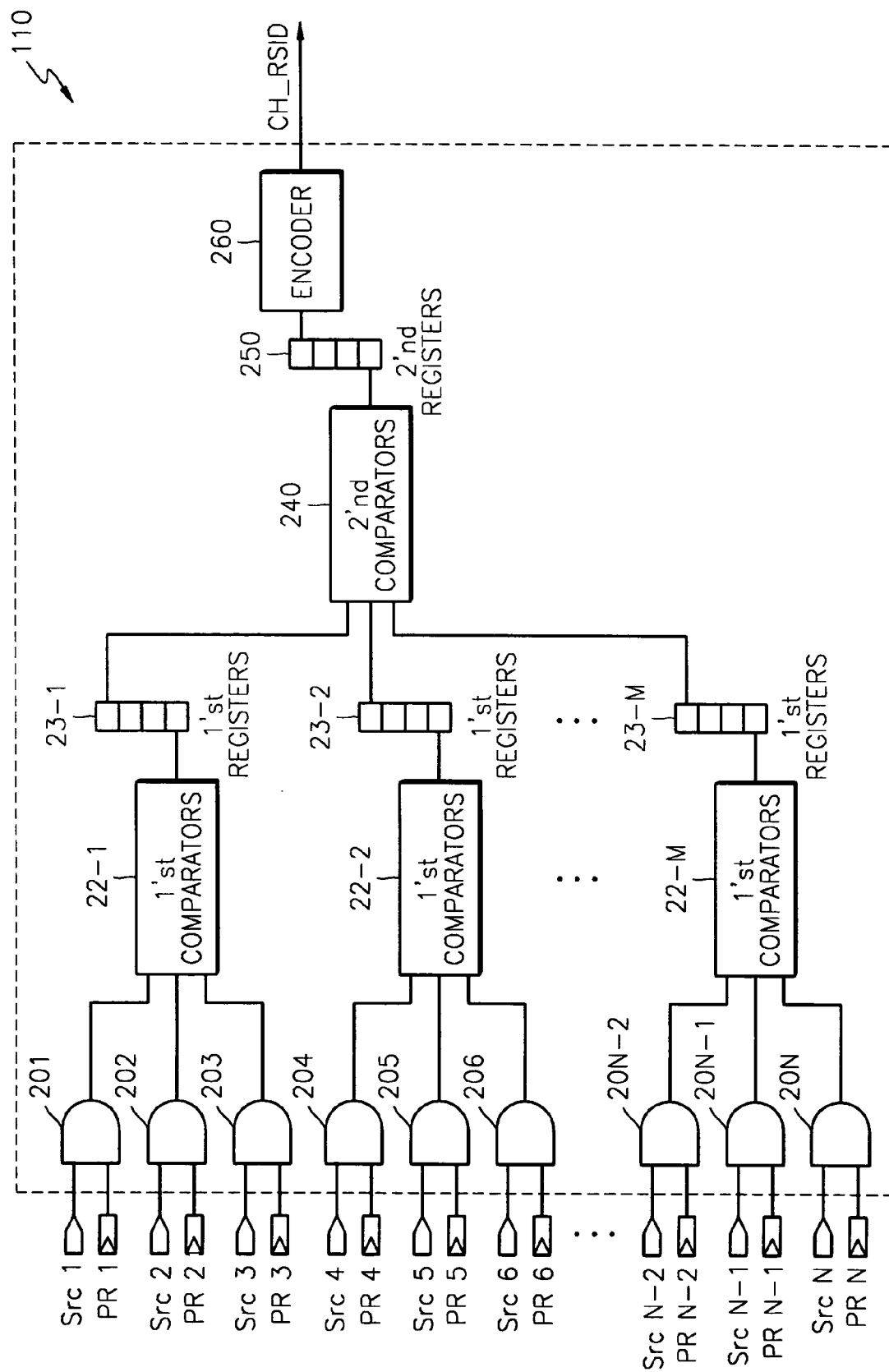
FIG. 2 is a circuit diagram illustrating in detail the structure of the priority calculating and channel request source selecting unit of FIG. 1.
Figure 3:
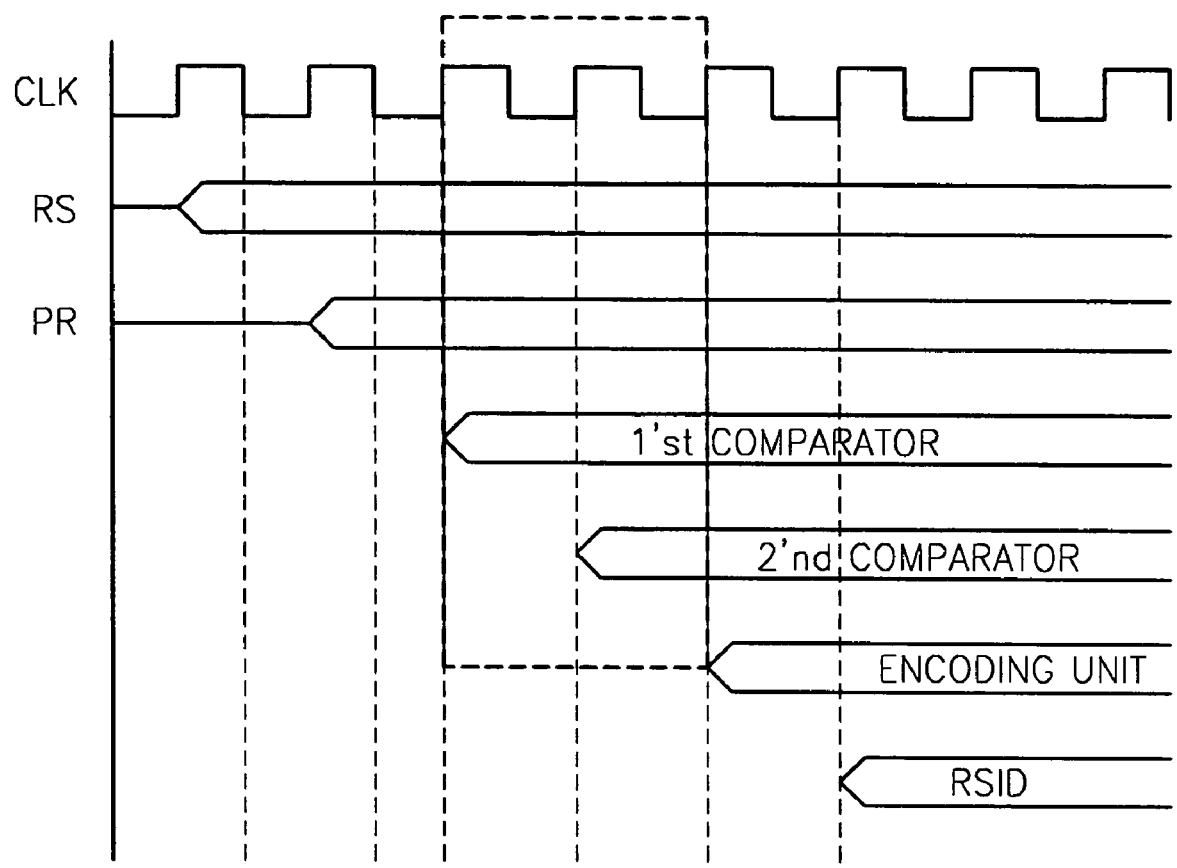
FIG. 3 is an operational timing diagram of the priority calculating and channel request source selecting unit of FIG. 2.

In contrast to the method of FIG. 6 and the systems 500 and 600 of FIGS. 4 and 5, the system 700 of FIG. 7 uses L channels. This structure is very useful for channel allocation of sources that require simultaneously use of several channels. In the conventional system, a channel is fixed to each source. Thus, in the prior art, when sources connected to one channel require simultaneously to transmit data using several channels, data transmission is not possible. For example, referring to FIG. 1, the sources Src 1 and Src 2 connected to channel 1 cannot transmit data simultaneously.

However, in the embodiment of the present invention illustrated in FIG. 7, the connection between the channels and sources Src 1~Src N are not fixed. That is, one or more of the plurality of sources Src 1~Src N can be applied to both of the channel request source selecting units 710 and 730, and therefore when some of sources Src 1~Src N simultaneously request the use of channels, if some sources which request are selected by source IDs of the registers 755 and 775, transmission of signals through both of channels 760 and 780 can be accomplished.

Figure 8:
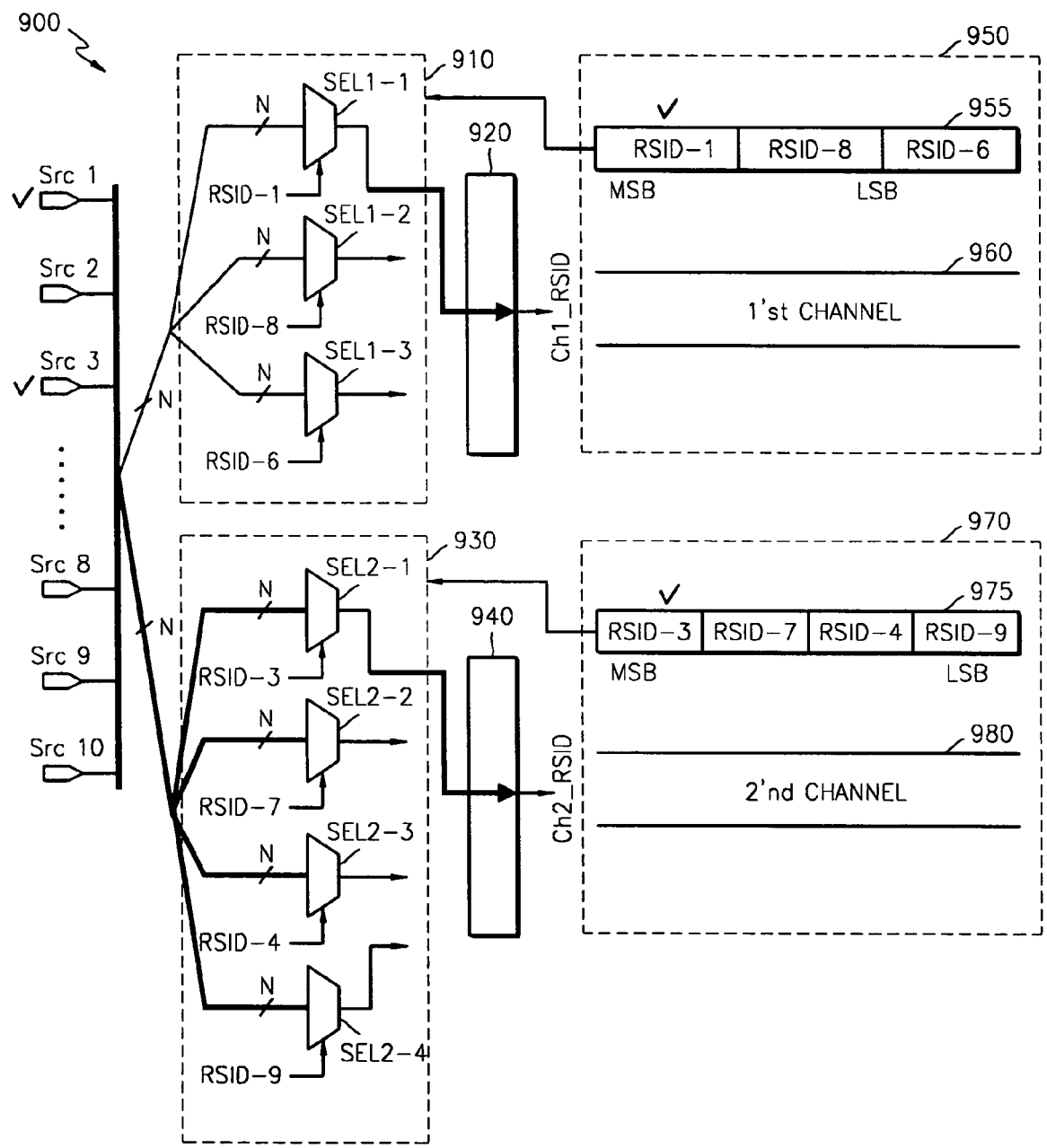
FIG. 8 contains a schematic block diagram of an illustrative example of the system of FIG. 7

FIG. 8 is a schematic block diagram of an example of the system of FIG. 7. The system 900 of FIG. 8 includes the requested source selecting units 910 and 930 and the searching logic units 920 and 940, which perform the same functions as their counterparts in the embodiments described above. With reference to FIG. 8, for this example, it is assumed that N=10, i=3, j=4, and encoded values of a plurality of sources Src 1~Src 10 are RSID-1~RSID-10, respectively. Three input sources to use the first channel are stored in the order RSID-1, RSID-8, and RSID-6 as shown in a register 955, and four input sources to use the second channel are stored in the order RSID-3, RSID-7, RSID-4, and RSID-9 as shown in a register 975. When the input sources Src 1 and Src 3 simultaneously try to transmit data, the input source Src 1 transmits data through the first channel, and the input source Src 3 transmits data through the second channel.

According to this embodiment, priority values and combination (register configuration) of a source using a channel are made at a channel stage, and thus, a combination of sources for simultaneous data transmission can be made within a range of L, i.e., the number of channels.

Figure 9:
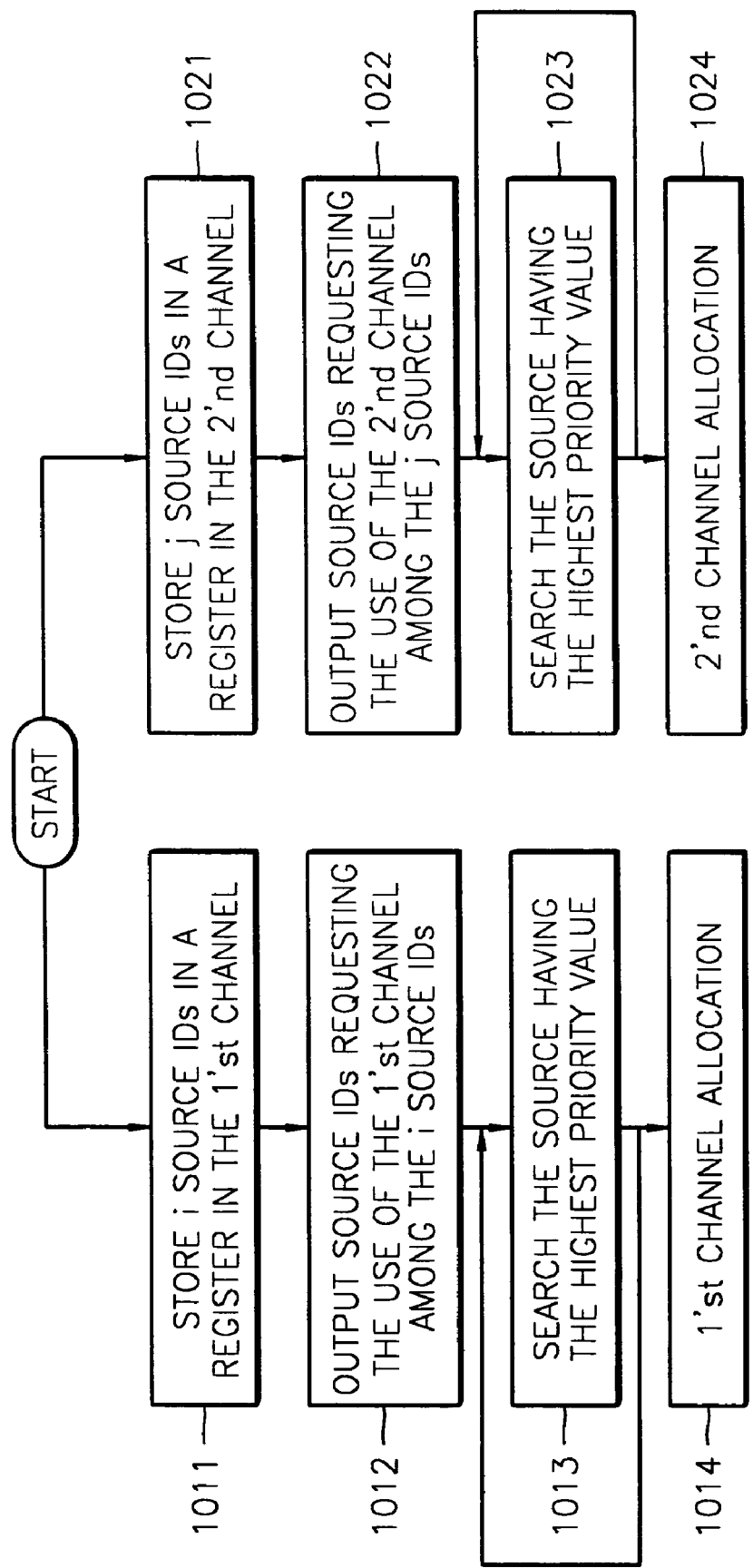
FIG. 9 is a flowchart illustrating a method for allocating a plurality of requested sources to a plurality of channels in accordance with the invention.

FIG. 9 is a flowchart illustrating a method for allocating a plurality of requested sources to a plurality of channels, as described with reference FIGS. 7 and 8 above. In this example, two channels are used, as described in FIGS. 7 and 8. Referring to FIG. 9, in step 1011, i source IDs are stored in a register provided at a first channel. In this case, the source IDs are stored in the register according to their priorities. In step 1012, source IDs that request the use of the first channel among the i source IDs are output. In step 1013, among the output source IDs, a source having the highest priority value is searched. In step 1014, the first channel is allocated to the searched source as a result of step 1013. After service of the first channel is completed, the method proceeds to step 1013, and a source having the next highest priority value among remaining sources is searched. The flow from step 1021 to step 1024 representing service of a second channel is the same as the flow from step 1011 to step 1014 representing the service of the first channel, and thus a description thereof will not be repeated.

Figure 10:
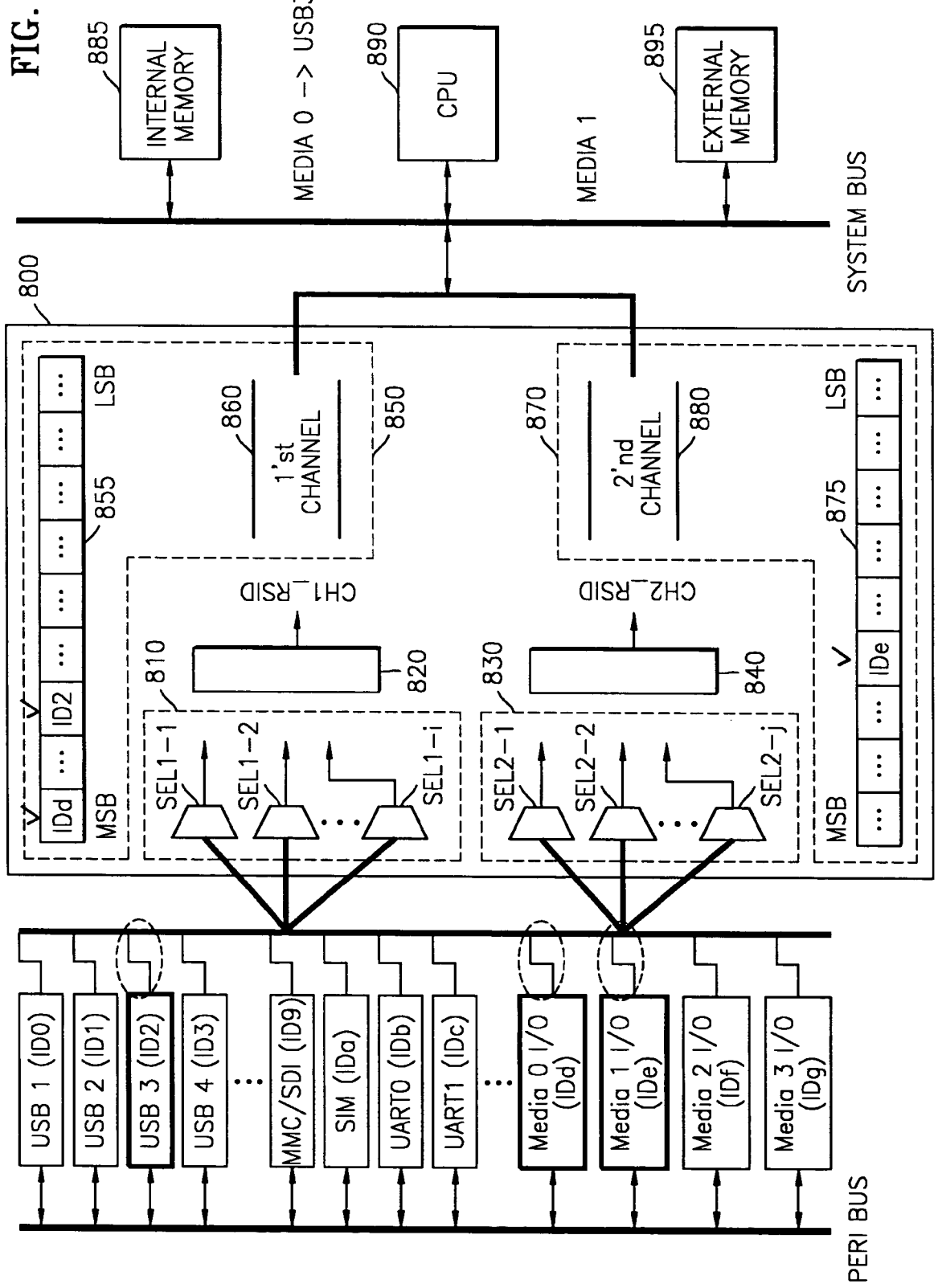
FIG. 10 contains a schematic block diagram of a system having a direct memory access (DMA) controller according to another embodiment of the present invention.

FIG. 10 contains a schematic block diagram of a system having a direct memory access (DMA) controller according to another embodiment of the present invention. Referring to FIG. 10, the DMA controller 800 for controlling direct transmission of data includes first through L-th requested channel source selecting units 810 and 830 and first through L-th channel units 850 and 870. (Hereinafter, it is assumed that L=2.)

The first and second channel units 850 and 870 include registers 855 and 875, respectively, in which a predetermined number i and j of input sources are stored according to their priorities. (As described in connection with FIG. 7, the number of i and j of the input sources stored in each register provided to each channel is determined according to the characteristics of each channel, and therefore they may be the same or different.) The requested channel source selecting units 810 and 830 and the channel units 850 and 870 of the DMA controller 800 have the same structure and function as those of their counterparts in the embodiments described above in connection with FIG. 7.

In this aspect of the invention, the sources can include modules which directly transmit and receive data to and from external devices 885, 890, and 895 by a direct memory access (DMA). Also, the external devices 885, 890, and 895 may be memories or processors such as CPUs. Sources connected to a peripheral bus PERI BUS request the DMA controller 800 to use channels 860 and 880 to transmit and receive data to and from the external devices 885, 890, and 895 via the DMA.

Universal serial bus (USB) modules, universal asynchronous receiver/transmitter (UART) modules, MEDIA modules, SIM modules, and MMC modules are shown as sources in FIG. 10. However, there are a variety of sources which transmit data using a channel. When a request signal for data transmission is simultaneously requested from a plurality of sources, the DMA controller 800 allocates services corresponding to the number of channels by considering priorities. As shown in FIG. 10, for purposes of illustration, it is assumed that each of sources USB 1, USB 2, . . . , and Media 3 I/O has a source IDs such as ID 0, ID 1, . . . , ID f, and ID g. Also, it is assumed that a source ID IDd representing a module MEDIA 0 is stored in a MSB of the register 855 of the first channel unit 850 and a source ID ID2 representing a module USB 3 is stored in a third location of the register 855. Further, it is assumed that a source ID IDe representing a module MEDIA 1 is stored in a fourth location of the register 875 of the second channel unit 870. If the modules MEDIA 0, USB 3, and MEDIA 1 simultaneously request the DMA controller 800 to use a channel to transmit data to external devices, a first selecting means (first SEL1-1) of the requested source selecting unit 810 outputs the source ID IDd representing the module MEDIA 0. A third selecting means (not shown) of the first requested source selecting unit 810 outputs the source ID ID2 representing the module USB 3. A fourth selecting means (not shown) of the second requested source selecting unit 830 outputs the source ID IDe representing the module MEDIA 1.

Since, in this embodiment, the first searching logic unit 820 and the second searching logic unit 840 sequentially search a source having the highest priority value, request of the module MEDIA 0 is accepted at the first channel, and thus, a service for Media 0 proceeds. Also, request of the module Media 1 is accepted at the second channel, and thus, service for Media 1 proceeds. In the case of the first channel, if service of the module Media 0 is completed, DMA service of the module USB 3 proceeds.

In the case of a conventional DMA controller, modules such as MEDIA 0 or MEDIA 1 having a similar function use the same channel. Thus, if the modules MEDIA 0 and MEDIA 1 simultaneously request the use of channels, the channels cannot be used. However, in the case of the DMA controller 800 according to the present embodiment, even though several modules simultaneously request data transmission, data transmission can be rapidly achieved by the DMA. In addition, a combination of modules can be made at any time by changing values of the registers 855 and 875 in the first and second channels such that the modules flexibly meet simultaneous data transmission.

While this invention has been particularly shown and described with reference to preferred embodiments thereof, it will be understood by those skilled in the art that various changes in form and details may be made therein without departing from the spirit and scope of the invention as defined by the appended claims.

The invention claimed is:

1. A system for transferring a signal to a channel, comprising:
   a storage unit dedicated to the channel for storing source identification information of a plurality of predetermined sources, the source identification information indicating an order of priority of the plurality of predetermined sources for access to the channel;
   a plurality of selection circuits for receiving input signals from at least one of the plurality of predetermined sources and the source identification information of the plurality of predetermined sources from the storage unit, each of the selection circuits receives source identification information for one of the plurality of predetermined sources and each of the selection circuits selects one of the plurality of input signals in response to the source identification information for the one of the plurality of predetermined sources wherein the plurality of selection circuits receive the source identification information for the plurality of predetermined sources in order of priority such that a first selection circuit of the plurality of selection circuits receives source identification information for a highest-priority source; and
   a circuit for checking outputs of the selection circuits and forwarding selected input signals to the channel,
   wherein the storage unit stores the source identification information in a long bit sequence in an order of priority and stores the source identification information for the highest-priority source in the most significant bits of the storage unit.

2. The system of claim 1, wherein each selection circuit selects the selected input signal according to a state of a respective control input to the selection circuit.

3. The system of claim 1, wherein the storage unit is a register.

4. The system of claim 1, wherein the storage unit stores the source identification information for the plurality of predetermined sources in order of priority of the sources for access to the channel.

5. The system of claim 1, wherein the storage unit sequentially stores the source identification information according to priority from the most significant bits to the least significant bits of the storage unit.

6. The system of claim 1, wherein the storage unit sequentially stores the source identification information according to priority from the least significant bits to the most significant bits of the storage unit.

7. The system of claim 1, wherein the circuit checks the outputs of the selection circuits in a predetermined sequence.

8. The system of claim 7, wherein the circuit sequentially checks the outputs of the selection circuits.

9. The system of claim 7, wherein the sequence is determined by an order in which the source identification information of the plurality of predetermined sources is stored in the storage unit.

10. The system of claim 1, wherein the circuit checks the outputs of the selection circuits in order of priority of the plurality of predetermined sources for forwarding input signals to the channel.

11. The system of claim 1, wherein the system includes a plurality of channels, input signals from the plurality of predetermined sources being able to be forwarded to the plurality of channels.

12. The system of claim 11, further comprising a plurality of storage units associated respectively with the plurality of channels.

13. The system of claim 12, wherein each of the storage units stores source identification information for a plurality of predetermined sources that are able to forward input signals onto the channel associated with the storage unit.

14. The system of claim 1, wherein the selection circuits are multiplexers.

15. The system of claim 14, wherein the multiplexers are ordered according to the sequence of the source identification information stored in the storage unit.

16. The system of claim 15, wherein the multiplexers are ordered according to priorities of the plurality of predetermined sources for forwarding input signals to the channel.

17. The system of claim 1, wherein the plurality of predetermined sources are applied to inputs of the selection circuits according to a predetermined order.

18. The system of claim 17, wherein the predetermined order depends on priority of the plurality of predetermined sources for access to the channel.

19. The system of claim 17, wherein the source identification information is generated according to the predetermined order such that the selection circuits select the plurality of predetermined sources based on priority of the plurality of predetermined sources for access to the channel.

20. The system of claim 1, further comprising a channel unit associated with the channel for processing information related to the channel.

21. The system of claim 20, wherein the storage unit is part of the channel unit.

22. A system for transferring signals to channels, comprising:
- a plurality of storage units, each storage unit being dedicated to one of the channels, and each storage unit being adapted to store source identification information indicating an order of priority of a plurality of predetermined sources for access to the channel;
- for each of the plurality of channels, a plurality of selection circuits for receiving input signals from at least one of the plurality of predetermined sources and the source identification information of the plurality of predetermined sources from the plurality of storage units, each of the selection circuits receives source identification information for one of the plurality of predetermined sources and each of the selection circuits selects one of the plurality of input signals in response to the source identification information for the one of the plurality of predetermined sources, wherein the plurality of selection circuits receive the source identification information for the plurality of predetermined sources in order of priority such that a first selection circuit of the plurality of selection circuits receives source identification information for a highest-priority source; and
- for each of the plurality of channels, a circuit for checking outputs of the selection circuits and forwarding selected input signals to the channel,
- wherein each storage unit stores the source identification information in a long bit sequence in an order of priority and stores the source identification information for the highest-priority source in the most significant bits of the storage unit.

23. The system of claim 22, wherein each selection circuit selects the selected input signal according to a state of a respective control input to the selection circuit.

24. The system of claim 22, wherein one or more of the plurality of predetermined sources are allocated to one or more of the channels.

25. The system of claim 24, wherein the allocation of the plurality of predetermined sources to the channels is controllable by controlling storage of source identification information in the storage units.

26. The system of claim 22, wherein the storage units are registers.

27. The system of claim 22, wherein each of the storage units stores its source identification information for the plurality of predetermined sources in order of priority of the plurality of predetermined sources for access to the associated channel.

28. The system of claim 22, wherein the selection circuits are multiplexers.

29. The system of claim 28, wherein the multiplexers are ordered according to the sequence of the source identification information stored in the storage unit.

30. The system of claim 28, wherein the multiplexers are ordered according to priorities of the plurality of predetermined sources for forwarding input signals to the channels.

31. The system of claim 22, wherein the plurality of predetermined sources are applied to inputs of the selection circuits according to a predetermined order.

32. The system of claim 31, wherein the predetermined order depends on priority of the plurality of predetermined sources for access to the channels.

33. The system of claim 31, wherein the source identification information is generated according to the predetermined order such that the selection circuits select the plurality of predetermined sources based on priority of the plurality of predetermined sources for access to the channels.

34. The system of claim 22, further comprising a plurality of channel units associated respectively with the plurality of channels for processing information related to the channels.

35. The system of claim 34, wherein each of the storage units is part of one of the channel units.

36. A direct memory access (DMA) controller for controlling transfer of signals from predetermined input sources to output devices, a plurality of channels being connected to the output devices, the DMA controller comprising:
- a plurality of storage units, each storage unit being dedicated to one of the channels, and each storage unit being adapted to store source identification information indicating an order of priority of the predetermined sources for access to the channel;
- for each of the plurality of channels, a plurality of selection circuits for receiving input signals from at least one of the predetermined sources and the source identification information of the predetermined sources from the plurality of storage units, each of the selection circuits receives source identification information for one of the plurality of predetermined sources and each of the selection circuits selects one of the plurality of input in response to the source identification information for the one of the plurality of predetermined sources, wherein the plurality of selection circuits receive the source identification information for the plurality of predetermined sources in order of priority such that a first selection circuit of the plurality of selection circuits receives source identification information for a highest-priority source;
- for each of the plurality of channels, a circuit for checking outputs of the selection circuits and forwarding selected input signals to the channel,
- wherein each storage unit stores the source identification information in a long bit sequence in an order of priority and stores the source identification information for the highest-priority source in the most significant bits of the storage unit.

37. The DMA controller of claim 36, wherein each selection circuit selects the selected input signal according to a state of a respective control input to the selection circuit.

38. The DMA controller of claim 36, wherein one or more of the predetermined sources are allocated to one or more of the channels.

39. The DMA controller of claim 36, wherein the allocation of the predetermined sources to the channels is controllable by controlling storage of source identification information in the storage units.

40. The DMA controller of claim 36, wherein the storage units are registers.

41. The DMA controller of claim 36, wherein each of the storage units stores its source identification information for the predetermined sources in order of priority of the predetermined sources for access to the associated channel.

42. The DMA controller of claim 36, wherein the selection circuits are multiplexers.

43. The DMA controller of claim 42, wherein the multiplexers are ordered according to the sequence of the source identification information stored in the storage unit.

44. The DMA controller of claim 42, wherein the multiplexers are ordered according to priorities of the predetermined sources for forwarding input signals to the channels.

45. The DMA controller of claim 36, wherein the predetermined sources are applied to inputs of the selection circuits according to a predetermined order.

46. The DMA controller of claim 45, wherein the predetermined order depends on priority of the predetermined sources for access to the channels.

47. The DMA controller of claim 45, wherein the source identification information is generated according to the predetermined order such that the selection circuits select the predetermined sources based on priority of the predetermined sources for access to the channels.

48. The DMA controller of claim 36, further comprising a plurality of channel units associated respectively with the plurality of channels for processing information related to the channels.

49. The DMA controller of claim 39, wherein each of the storage units is part of one of the channel units.

50. A method for transferring signal to a channel, comprising:
   storing source identification information for a plurality of predetermined sources in a storage unit, the source identification information indicating an order of priority of the plurality of predetermined sources for access to the channel;
   providing a plurality of selection circuits for receiving input signals from at least one of the plurality of predetermined sources and the source identification information of the plurality of predetermined sources, each of the selection circuits receiving source identification information for one of the plurality of predetermined sources and each of the selection circuits selecting one of the plurality of input signals in response to the source identification information for the one of the plurality of predetermined sources, wherein the plurality of selection circuits receive the source identification information for the plurality of predetermined sources in order of priority such that a first selection circuit of the plurality of selection circuits receives source identification information for a highest-priority source;
   with a checking circuit, checking outputs of the selection circuits and forwarding a selected input signal to the channel,
   wherein the storage unit stores the source identification information in a long bit sequence in an order of priority and stores the source identification information for the highest-priority source in the most significant bits of the storage unit.

51. The method of claim 50, wherein each selection circuit selects the selected input signal according to a state of a respective control input to the selection circuit.

52. The method of claim 50, wherein the storage unit is a register.

53. The method of claim 50, wherein the storage unit stores the source identification information for the plurality of predetermined sources in order of priority of the plurality of predetermined sources for access to the channel.

54. The method of claim 50, wherein the storage unit sequentially stores the source identification information according to priority from the most significant bits to the least significant bits of the storage unit.

55. The method of claim 50, wherein the storage unit sequentially stores the source identification information according to priority from the least significant bits to the most significant bits of the storage unit.

56. The method of claim 50, wherein the circuit checks the outputs of the selection circuits in a predetermined sequence.

57. The method of claim 56, wherein the circuit sequentially checks the outputs of the selection circuits.

58. The method of claim 56, wherein the sequence is determined by an order in which the source identification information of the plurality of predetermined sources is stored in the storage unit.

59. The method of claim 50, wherein the checking circuit checks the outputs of the selection circuits in order of priority of the plurality of predetermined sources for forwarding input signals to the channel.

60. The method of claim 50, wherein the communication system includes a plurality of channels, input signals from the plurality of predetermined sources being able to be forwarded to the plurality of channels.

61. The method of claim 60, further comprising providing a plurality of storage units associated respectively with the plurality of channels.

62. The method of claim 61, wherein each of the storage units stores source identification information for a plurality of predetermined sources that are able to forward input signals onto the channel associated with the storage unit.

63. The method of claim 50, wherein the selection circuits are multiplexers.

64. The method of claim 63, wherein the multiplexers are ordered according to the sequence of the source identification information stored n the storage unit.

65. The method of claim 63, wherein the multiplexers are ordered according to priorities of the plurality of predetermined sources for forwarding input signals to the channel.

66. The method of claim 50, wherein the plurality of predetermined sources are applied to inputs of the selection circuits according to a predetermined order.

67. The method of claim 66, wherein the predetermined order depends on priority of the plurality of predetermined sources for access to the channel.

68. The method of claim 66, wherein the source identification information is generated according to the predetermined order such that the selection circuits select the plurality of predetermined sources based on priority of the plurality of predetermined sources for access to the channel.

69. The method of claim 50, further comprising a channel unit associated with the channel for processing information related to the channel.

70. The method of claim 69, wherein the storage unit is part of the channel unit.

* * * * *